Aug. 20, 1935.          C. J. HALBORG                    2,011,630
                         SPIRAL BROACH
                      Filed Dec. 9, 1932           2 Sheets-Sheet 2
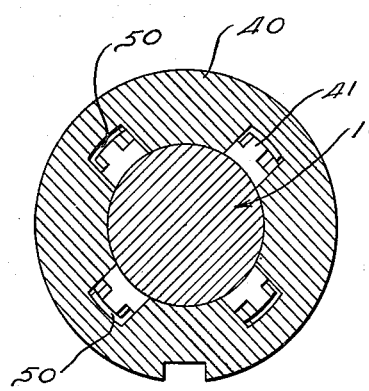
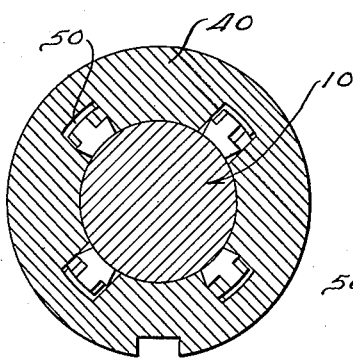
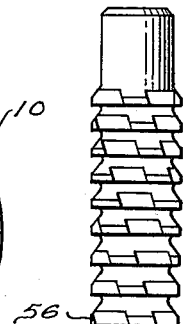
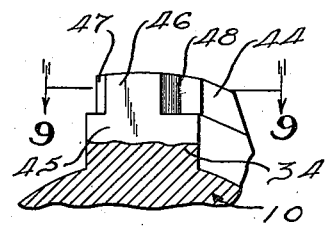
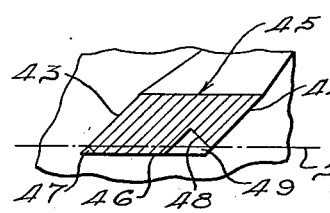
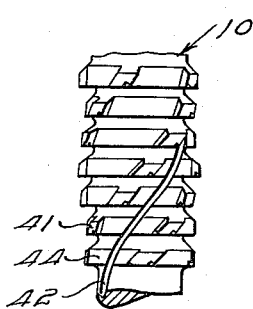
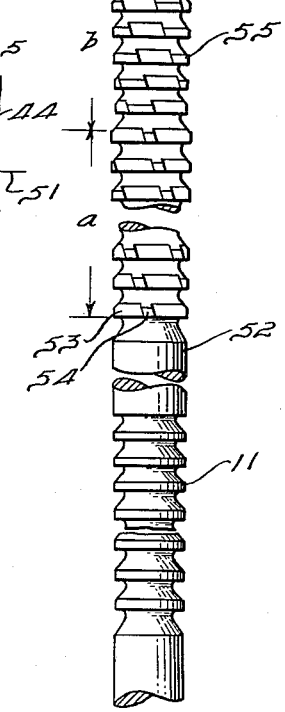
INVENTOR
Carl J. Halborg.
BY
Harness, Wickey, Pierce & Hann
ATTORNEYS.

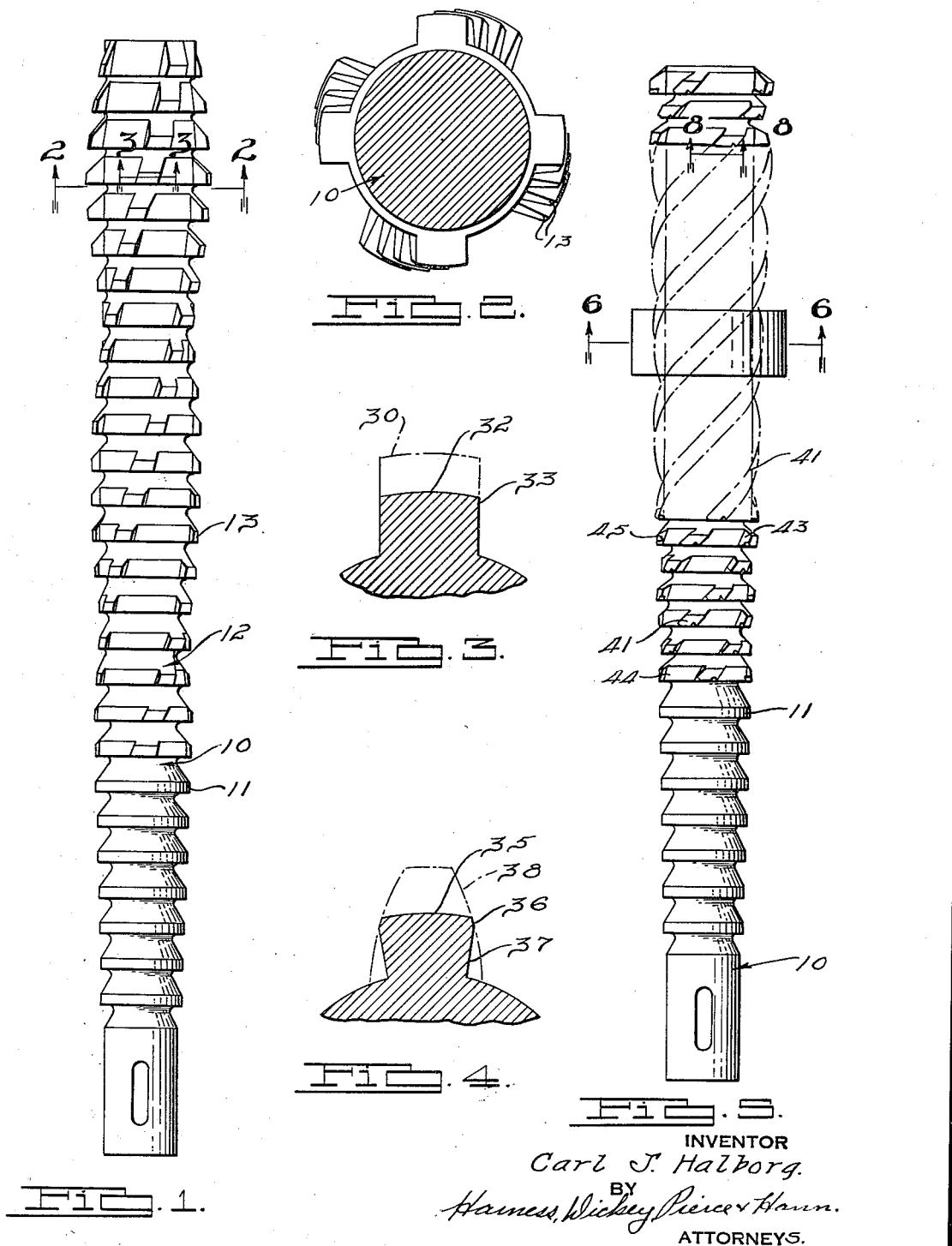

Patented Aug. 20, 1935

2,011,630

UNITED STATES PATENT OFFICE 2,011,630

SPIRAL BROACH

Carl J. Halborg, Detroit, Mich., assignor to Colonial Broach Company, a corporation of Michigan Application December 9, 1932, Serial No. 646,541

9 Claims. (Cl. 29—95.1)

My invention relates to broaches and particularly to broaches of the spiral type wherein the rows of cutting teeth of increasing height are disposed in helical paths about the axis of the broach.

Broaches of the spiral type have been made heretofore for coarse work and have been constructed on a milling machine with milling machine cutters. These broaches were of the conventional type and were not employed for precision work. In practicing my present invention I effect the grinding of the rows of teeth of the broaches to precise dimensions so that the broach may be used for a finishing operation to accurately finish spiral splineways to predetermined dimensions. Through the success in perfecting the rows of spiral teeth through the grinding method, spiral splineways are now being employed in the automotive transmission art where heretofore straight splines were always utilized. Other applications of the accurate spiral splines have been found and more are being studied in view of the success attained by the broaches made under the present inventive process.

Accordingly, the main objects of my invention are to provide a broach with rows of teeth disposed in spiral relation to the axis of the cutter and which are of precise size, form and spacing; to construct accurate spiral rows of teeth by a grinding operation which accurately finishes the teeth to precise dimensions; to provide a plurality of annular cutting edges of increasing height on the front end of the broach before the spiral rows of teeth, for machining the aperture to be splined to precise dimensions; to provide a relief to the side cutting edges of the teeth in over-lapping relation to cutting edges of the prior teeth to prevent frictional engagement of the lower sides of subsequent teeth with the splineway already cut; to provide the side cutting edges with the shape of segments of an involute form in overlapping relation to progressively cut a groove the composite of which will produce an involute form; to provide intersecting surfaces on the front of the teeth to correct the obtuse and acute cutting edges which would otherwise be provided to have cutting edges which are substantially in the same plane and which are formed by sides substantially in right angle relation to each other; to provide rows of cutting teeth of narrow width and rapidly increasing height at the front portion of the broach for immediately cutting a spiral groove of a depth to provide bearing surfaces, to provide a row of teeth similar to the narrow teeth but of a desired width and with a similar rapid increase in height to quickly cut the spiral to exact width to provide guide bearing surfaces for the subsequent teeth, to provide means for mechanically turning the broach when the lead of the rows of teeth are short, and in general to provide a broach of the spiral type which is exceedingly accurate in form and which may be dressed after hardening to provide accurate side cutting edges.

Other objects and features of novelty of my invention will be either specifically pointed out or will become apparent when referring, for a better understanding of my invention, to the following description, in conjunction with the accompanying drawings, wherein:

Figure 1 is a plan view of a broach having spiral rows of cutting teeth which embody features of my invention, Fig. 2 is a sectional view of the structure illustrated in Fig. 1, taken on the line 2—2 thereof, Fig. 3 is a sectional view of the structure illustrated in Fig. 1, taken on the line 3—3 thereof, Fig. 4 is a sectional view of a broach similar to that of Fig. 3, showing a modified tooth form thereof, Fig. 5 is a view of a broaching tool similar to that illustrated in Fig. 1, showing a modified form thereof, Fig. 6 is a sectional view of the structure illustrated in Fig. 5, taken on the line 6—6 thereof, Fig. 7 is a sectional view similar to that illustrated in Fig. 6, showing a modified form thereof, Fig. 8 is a sectional view of the structure illustrated in Fig. 5, taken on the line 8—8 thereof, and Fig. 9 is a sectional view of the structure illustrated in Fig. 8, taken on the line 9—9 thereof, Fig. 10 is a broken elevational view of a broach illustrating a further modified form thereof, and Fig. 11 is a broken elevational view of a broach illustrating a further modified form thereof.

Referring to Fig. 1, I have illustrated a broach 10 having frontwardly disposed annular cutting edges 11 of progressive height from the front end, which are utilized for machining a hole to true accurate dimensions. Following the cutting edges 11, a plurality of rows 12 of teeth 13 of progressive height, are illustrated disposed in like spiral rows relative to the axis of the broach. The broach is preferably milled in accordance with the lead of the spiral rows in a milling machine before hardening and intersected by grooves disposed in planes at right angles to the axis of the broach to form the plurality of teeth of substantially exact and radially increasing dimensions. A slight amount of material is left on the sides of the rows of teeth for the grinding operation after hardening. The broach is then heat treated in a manner to reduce the warpage to a minimum by methods known in the art, such as normalizing before machining, suspending the broach in a vertical position in the furnaces and in accurately controlling the heating and quenching operations. After heat treatment the broach is ground to accurate form.

Referring to Fig. 3, a tooth of the broach is illustrated provided with a top cutting edge 32 and side cutting edges 33, the latter of which are in slight overlapping relation to the side cutting edges of the teeth disposed before and subsequent to the tooth shown in the figure. Below the cutting edge 33 a relief 34 may be provided to prevent the cutting edge from rubbing on the side of the spline or groove cut by the prior teeth. Such a form of tooth is illustrated and described in the Otto Lundell Reissue Patent No. 18,458 issued on May 10, 1932, and assigned to the assignee of the present invention. The teeth of the present application are, however, disposed in rows of spiral shape having their front cutting edges disposed at right angles to the axis of the broach. The sides, however, may be relieved in the manner as illustrated in the reissue patent and according to the showing of Figs. 4 and 7.

In Fig. 4, I have shown a further form of tooth, that for cutting a groove of involute form. The top cutting edge 35 of each tooth is of progressive height from the front to the rear of the broach and side cutting edges 36 the shape of a section of an involute form extend downwardly therefrom. The involute cutting edges 36 are in overlapping relation to the involute cutting edge of the next prior and subsequent teeth and are relieved at 37 therebelow to prevent the sides of the teeth from rubbing on the groove cut by the prior teeth. While I have shown the relief 37 as being disposed inwardly from the cutting edge 36, it can be disposed outwardly from a true horizontal plane and still not engage the sides of the groove already cut. This relief may be formed by employing a different pressure angle from that from which the involute cutting edges 36 were formed to dispose the sides of the teeth therebelow inwardly from the groove as cut by the preceding teeth. The aggregate of the slightly overlapping cutting edges 36 on the rows of teeth produces an involute shaped groove 38 as illustrated in dotted line in the figure. This form can be used on the teeth of straight broaches as well as on the spiral broaches and are illustrated with the front cutting edges disposed at right angles to the axis of the broach. While disposing the cutting edges at right angles to the axis of the broach is believed to be the preferred form of construction for the teeth, it is to be understood that other dispositions could be made.

Referring to Fig. 5, I have illustrated a broach similar to that illustrated in Fig. 1 with the exception that the rows of teeth 41 thereof are disposed on substantially a 45° lead angle or a lead considerably sharper than that illustrated for the rows of teeth shown in the broach illustrated in Fig. 1. The rows of teeth are constructed in the same manner as those of the broach illustrated in Fig. 1 with the front cutting edges thereof disposed in planes at right angles to the axis of the broach. When the rows of teeth have a long lead as on the rows 12, the broach itself will automatically be rotated relative to the work or vice versa, when drawn therethrough. The broach illustrated in Fig. 5 with the sharp lead requires mechanical means for rotating the broach and work relative to each other. A groove 42 may be provided between the rows of teeth, as illustrated in Fig. 11 when the angular cutting edges are omitted, for engagement with a projecting element (not shown) for the purpose of causing the work in engagement therewith or the broach to rotate relative to each other when the broach is drawn longitudinally relative to the work.

In Figs. 6 and 7, I have illustrated another method of rotating the broach, that of providing a spirally grooved collar 40 having the spiral grooves 50 thereof mated with the spiral teeth of the broach. The collar is threaded on the broach to a position approximately medially of its ends and, when the broach is disposed relative to the work, the collar is retained in fixed position to cause the broach to rotate as it is moved through the work. By the time the broach passes from the collar 40 sufficiently deep spline ways will have been cut in the work to form guides for the further machining operation. In Fig. 6 the teeth of the broach are shown as being unrelieved while in Fig. 7 they are shown relieved. In either construction the collar 40 effects the accurate turning of the broach relative to the lead of the rows of teeth.

As is readily apparent in Figs. 8 and 9, the angle formed by sides 43 and 44 of teeth 45 with the front edge 46 thereof disposed in a plane at right angles to the axis of the broach, is acute in the first instance and obtuse in the latter instance. Both of the cutting edges are objectionable due to the fact that the acute cutting edge will tend to cut too deeply into the sides of the work while the blunt obtuse edge will tend to avoid a cutting engagement therewith. To overcome these objectionable cutting edges, I have intersected the acute cutting edge between the sides 43 and 46 by a surface 47 which forms a right angle with the side 43 which is desirable. The cutting edge formed between the sides 44 and 46 is in like manner changed to a right angle cutting edge by the surface 48 formed by the cutaway portion 49 at the corner between the sides 46 and 44. It will be noted that this portion extends inwardly, so that the cutting edge between the surface 48 and 44 and the cutting edge between the surface 47 and the side 43 lie in the same plane as indicated by the dotted line 51. This is also desirable since such a construction will prevent the drifting of the broach which might occur when one cutting edge is provided in advance of the other. Referring to Fig. 7, it will be noted that the intersecting sides 47 and 48 extend downwardly from the top edge of the teeth only to the side relieved portion 34, or 37 as the case may be, and therebelow there is no contact between the sides of the teeth and the wall of the groove as cut by the prior teeth.

In Fig. 10, I have shown a broach 52 of further modified form wherein the annularly disposed edges 11 are utilized for dressing the surface of the aperture to be provided with spiral splineways, to accurate dimensions. The teeth of the broach are provided with annular supporting portions 53 which bear upon the sides of the accurately formed surface of the aperture and upon which are mounted teeth in spiral rows conforming to the lead of the splineway to be cut. A group "a" of narrow teeth 54 are formed to have a rapid increase in radial dimension so as to quickly cut a spiral groove of sufficient depth to provide bearing surfaces on the sides of the teeth to act as guides for the following teeth. Thereafter a second set of teeth 55 in a group "b" are provided, of a width conforming to the width of the splineway to be cut and rapidly increasing in height following the radial dimensions of the teeth in the "a" group to widen the spiral groove formed by the first group to the desired width. In this manner, not only is a sufficient depth provided to the groove as cut by the first group of teeth but the grooves are widened to receive the teeth 56 which increase very slowly in height towards the end of the broach. The teeth 56 are guided in the splineways cut by the teeth in groups "a" and "b" and thereby machine the splineway to accurate dimensions during the time they are guided therein. When the splineways are cut to sufficient depth no difficulty is found thereafter in having the rows of spiral teeth follow in the splineway so cut. Accordingly, the employment of a narrow row of teeth of rapidly increasing height is novel in quickly producing a spiral groove in the work and which thereby prevents the skidding of the broach as occurred when wide splineways are attempted to be cut by a spiral broach when being moved therethrough. Immediately following the narrow teeth, rows of wide teeth of rapid progressively increasing height are provided to machine the grooves thus formed to the width desired, which grooves are of sufficient depth to provide guides for the subsequent teeth which are of standard spiral form.

It is to be understood that the teeth of the broaches may be of square form as illustrated in Fig. 3 to machine the square or rectangular shaped groove 30 illustrated by dotted line, or may be of involute or other form, as illustrated in Fig. 4, to cut an involute or other known or desired shape of groove, as illustrated by the dotted line 38 in the figure. Where desirable, the cutting edges may be formed by sides at right angles to each other irrespective of the lead of the rows and the disposition of the cutting edge in a plane at right angles to the axis of the broach. This is accomplished through the expedient of intersecting the acute and obtuse edges formed by the sides of the rows of teeth and the front edges thereof by the surfaces 47 and 48 which, when desired, may be disposed in a single plane parallel to the plane of the front edges of the teeth. Mechanical means may be provided for rotating the broach or work relative to each other through the employment of a collar 40 or through the utilization of a groove 42 between the rows of teeth for rotating the broach and work relative to each other. In either of the broaches, the front portion may be provided with annular cutting edges 11 which are of progressive diameters, to machine the surface of the aperture to be provided with the spiral grooves, to a predetermined dimension. In like manner, the end of the broach may be provided with finishing cutting edges of the complete annular form and also spiral form to be employed when desirable to finally finish the aperture and the spiral grooves to accurate dimensions.

While I have illustrated and described several embodiments of my invention, it will be apparent to those skilled in the art that various changes, omissions, additions, and substitutions may be made therein without departing from the spirit and scope of my invention as set forth in the accompanying claims.

I claim as my invention:

1. A broach having a plurality of progressively increasing annular cutting teeth in the front portion thereof followed by spiral rows of teeth, having the top portion of the sides thereof provided with an involute form of cutting edges, the portion therebelow being relieved inwardly from a continuation of the involute form of cutting edge to prevent contact with the wall of the groove as cut by the prior teeth.

2. A broach having a plurality of progressively increasing annular cutting teeth in the front portion thereof followed by spiral rows of teeth, having the top portion of the side thereof provided with an involute form of cutting edge, the portion therebelow being relieved inwardly from a continuation of the involute form of cutting edge to prevent contact with the wall of the groove as cut by the prior teeth, the body portion of the broach being provided with a groove of the same lead as the lead of the rows of teeth.

3. A broach having a plurality of rows of cutting teeth of spiral shape, the base of the broach between the rows being provided with a groove of the same lead as said rows of teeth, to form within the length of the base portion having teeth, a master turning groove.

4. A broach having rows of spiral teeth with the front cutting edges disposed in planes normal to the axis of the broach, the side edge portion of which front cutting edges are cut away to provide surfaces in intersecting relation to the sides to provide side cutting edges which are of right angle form and disposed in a plane normal to the axis of the broach.

5. A broach having a spiral row of teeth, the front cutting edges of which are disposed in planes normal to the axis of the broach and having cutting edges the sides of which are at right angles to each other.

6. A broach having a row of teeth of spiral shape, with the front cutting edges thereof disposed in planes normal to the axis of the broach and having cutting edges at the top side portion of the teeth disposed in a plane normal to the axis of the broach the sides of said cutting edges being at right angles to each other, the portion of the teeth therebelow being relieved from the extension of the cutting edges of the prior teeth.

7. A broach having spiral rows of teeth thereon, the frontwardmost teeth being of narrow width and rapidly increasing height, followed by a row of teeth of desired width of like rapidly increasing height, and followed thereby by spiral rows of teeth of less rapid increasing height to finish the broach.

8. A broach provided with a plurality of groups of different teeth; the first group being provided with annular cutting edges for dressing the inner diameter of an aperture; the following group of teeth being of narrow width and of rapid increased progressive height to machine a groove of sufficient depth to act as a guide; followed by another group of cutting edges of a width desired and of like rapid increased progressive height to machine the groove to proper lateral dimensions; all of which is followed by a group of teeth of less rapid increasing progressive height for machining the groove to accurate dimensions.

9. A broach having a spiral row of teeth, the front cutting edges of which are disposed in planes normal to the axis of the broach and having cutting edges the sides of which are at right angles to each other, said cutting edges being disposed in a plane normal to the axis.

CARL J. HALBORG.